(12) United States Patent
Hisano et al.

(10) Patent No.: US 7,433,179 B2
(45) Date of Patent: Oct. 7, 2008

(54) ELECTRONIC APPARATUS HAVING UNIVERSAL HUMAN INTERFACE

(75) Inventors: Katsumi Hisano, Matsudo (JP); Masanori Ozawa, Kawasaki (JP); Ryo Furukawa, Kawasaki (JP); Minoru Mukai, Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 238 days.

(21) Appl. No.: 11/196,462

(22) Filed: Aug. 4, 2005

(65) Prior Publication Data
US 2006/0034042 A1 Feb. 16, 2006

(30) Foreign Application Priority Data
Aug. 10, 2004 (JP) ............................. 2004-223643

(51) Int. Cl.
*H05K 5/00* (2006.01)
*G06F 3/041* (2006.01)
*G09G 5/00* (2006.01)
*G02F 1/1333* (2006.01)

(52) U.S. Cl. ............... 361/681; 345/905; 345/173; 345/156; 349/58; 349/65

(58) Field of Classification Search ........... 345/169, 345/905, 173, 156; 361/681, 683; 312/223.1, 312/223.2; 248/917–923; 349/58, 65
See application file for complete search history.

(56) References Cited

U.S. PATENT DOCUMENTS 5,900,848 A * 5/1999 Haneda et al. ............... 345/1.1

6,067,079 A * 5/2000 Shieh ......................... 345/173
6,567,102 B2 * 5/2003 Kung .......................... 345/660

(Continued)

FOREIGN PATENT DOCUMENTS

CN 1289091 A 3/2001

(Continued)

OTHER PUBLICATIONS

Notification of the First Office Action issued by the Chinese Patent Office on Nov. 10, 2006, for Chinese Patent Application No. 200510091447.5, and English-language translation thereof.

(Continued)

*Primary Examiner*—Jayprakash N Gandhi
*Assistant Examiner*—Zachary M Pape
(74) *Attorney, Agent, or Firm*—Finnegan, Henderson, Farabow, Garrett & Dunner, L.L.P.

(57) ABSTRACT

An electronic apparatus includes first and second display devices having first and second display screens held in first and second housings, respectively. The second display screen is provided with a sensor which generates an output signal determining an input area in response to an external predetermined input to the second display screen. The first and second housings are connected together by a connecting mechanism so that an opening angle between the first and second housings can be adjusted. A first interface image is displayed on the second display screen. An instruction input to the interface image is determined on the basis of a sensor output signal. In response to the instruction input, a second display image is displayed in place of the first display image. In response to the instruction input, a second interface image is displayed in place of the first interface image.

5 Claims, 10 Drawing Sheets

U.S. PATENT DOCUMENTS 6,597,348 B1 * 7/2003 Yamazaki et al. ............ 345/175
7,127,776 B2 * 10/2006 Park ............................ 16/239

FOREIGN PATENT DOCUMENTS

| CN | 1505778 A | 6/2004 |
|---|---|---|
| JP | 1-149120 | 6/1989 |
| JP | 2-127720 | 5/1990 |
| JP | 3-086442 | 4/1991 |
| JP | 5-289817 | 11/1993 |
| JP | 6-083523 | 3/1994 |
| JP | 9-130935 | 5/1997 |
| JP | 9-305259 | 11/1997 |
| JP | 9-305262 | 11/1997 |
| JP | 11-265241 A1 | 9/1999 |
| JP | 2000-010655 | 1/2000 |
| JP | 2000-056877 | 2/2000 |
| JP | 2001-45124 | 2/2001 |
| JP | 2003-196012 | 7/2003 |
| JP | 2003-280622 | 10/2003 |
| JP | 2004-151155 A1 | 5/2004 |
| JP | 2004-153327 A1 | 5/2004 |
| JP | 2004-153329 A1 | 5/2004 |

OTHER PUBLICATIONS

U.S. Appl. No. 11/198,302, filed Aug. 8, 2005, Hisano et al.
U.S. Appl. No. 11/205,981, filed Aug. 18, 2005, Ozawa et al.
U.S. Appl. No. 11/233,072, filed Sep. 23, 2005, Ozawa et al.
U.S. Appl. No. 11/236,611, filed Sep. 28, 2005, Ozawa et al.
Notification of Reasons for Rejection mailed Oct. 9, 2007, in corresponding Japanese Appl. No. 2004-233643.
Final Notice of Rejection from the Japanese Patent Office, mailed Feb. 19, 2008, in corresponding Japenese Application No. 2004-2333643.

* cited by examiner

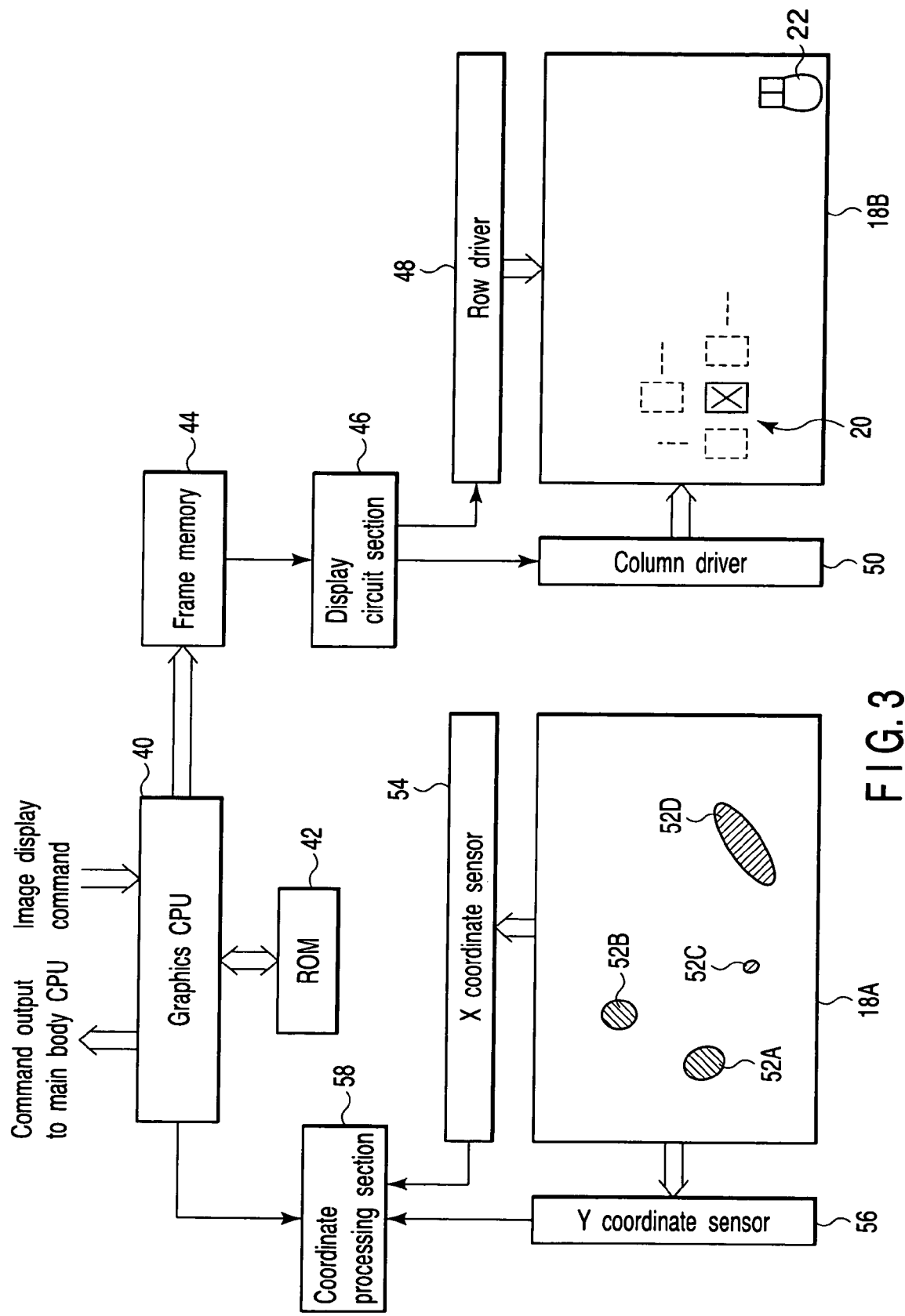
F I G. 3

ELECTRONIC APPARATUS HAVING UNIVERSAL HUMAN INTERFACE

CROSS-REFERENCE TO RELATED APPLICATIONS

This application is based upon and claims the benefit of priority from prior Japanese Patent Application No. 2004-233643, filed Aug. 10, 2004, the entire contents of which are incorporated herein by reference.

BACKGROUND OF THE INVENTION

1. Field of the Invention

The present invention relates to an electronic apparatus having a universal human interface, and in particular, to improvements in a user interface for a portable information apparatus having a planar display device and a device that allows a user to provide inputs using the user's finger or a stylus.

2. Description of the Related Art

Notebook personal computers, PDAs, cellular phones, and the like are known as typical electronic apparatuses having user interfaces. For example, a conventional notebook personal computer comprises, as a user interface, a display such as a liquid crystal display which displays characters, graphics s, and the like on a plane surface, and a keyboard that allows a user to input characters by depressing keys arranged in a predetermined manner, as described in Jpn. Pat. Appln No. 1997-130935. In such a notebook personal computer, the display and the keyboard are held in respective independent housings, which are foldably connected together using hinges. When the notebook personal computer is used, the keyboard is placed on a plane almost parallel to a desk surface by appropriately adjusting the hinge angle of one of the housings to that of the other, both housings being placed on the desk surface. The display is placed so as to face the user. The user can input characters from the keyboard and move a cursor by operating keys on which arrows are printed. A pointing device called a touch pad is provided on the surface of the housing in which the keyboard is installed; the touch pad is located farther from the hinge than the keyboard. The user can move the mouse cursor by touching this pointing device with his or her fingertip. Available pointing devices include a stick system that allows the user to move the mouse cursor by using his or her finger to exert a force on a stick provided near the center of the keyboard.

In general, for portable electronic apparatuses, portability is inconsistent with operability and visibility associated with ease of use. It has thus been desirable to make portability consistent with ease of use. That is, the notebook personal computer is an information apparatus that the user carries with him or her for use. Accordingly, the sizes of the housings are important specification items. Obviously, the display area of the display decreases consistently with housing size. Further, when the notebook personal computer is equipped with a keyboard having a key arrangement and a key number significantly different from the standards, the general-purpose properties of the notebook personal computer are degraded. Consequently, the key pitch of the keyboard decreases consistently with housing size. The consistence between portability and the human interface is very important for the notebook personal computer. Thus, notebook personal computers are classified into a category including what is called full-size notebook personal computers which are inferior in portability and which have large housings, a large screen, and almost the same key pitch as that of desktop computers and a category including notebook personal computers having mobile housings which are small and easy to carry out but which have a small-sized screen, a small key pit, and a small touch pad area, that is, an inferior human interface. The user selects the category to which the personal computer the user is to purchase belongs, assuming a situation in which the personal computer is most frequently used. Also in this regard, for portable electronic apparatuses, portability must be compatible with ease of use.

For portable electronic apparatuses, it is desirable to improve the operability of the pointing device. To move the mouse cursor on the screen using the touch pad, the user must move the mouse cursor within a plane much smaller than the screen by moving his or her finger. This pointing device is considered to offer operability inferior to that of a mouse connected to the notebook personal computer and which can be moved to a larger extent than the touch pad in controlling the mouse cursor. Similarly, to move the mouse cursor using the stick, the user must use the force of his or her finger to adjust the movement of the position of the mouse cursor. This pointing device is considered to offer operability inferior to that of a mouse connected to the notebook personal computer and which can be moved to a larger extent than the stick in controlling the mouse cursor.

The mouse, which is externally installed, is easier to operate than the touch pad, which is incorporated into the notebook personal computer because it allows the user to use a larger area than the touch pad. However, disadvantageously, the user must move his or her arm quite a long distance in a horizontal direction from the keyboard, from which the user commonly provides inputs using both hands, to the mouse, which is operated with the user's right or left hand. Further, when it is difficult to operate the computer using the mouse, hardware such as a joy stick or a game pad must be mounted on the computer as an external input device, the hardware being specialized for software. Such hardware may not offer sufficient general-purpose properties and is likely to be infrequently used. Disadvantageously, the cost effectiveness of the device introduced by the user is virtually low. Further, manufacturing many devices infrequently used may lead to contamination of environment and consumption of resources. Also in this regard, the use of such hardware is not preferable.

Notebook personal computers are also commercially available which have an electromagnetic or pressure-sensitive touch panel lying on top of an LCD panel so that direct touch with the screen enables the position on the screen to be input. However, with such a notebook personal computer, when inputting characters, while editing the input characters using the pointing device, the user must frequently move his or her arm a relatively long distance against gravity from the keyboard to the screen. This is disadvantageously inappropriate if both keyboard and pointing device are frequently operated.

Further, such a notebook personal computer enables the user to input characters by displaying a software-based keyboard on the screen and depressing virtual keys. However, the keyboard is almost two-dimensionally placed on a desk surface, and the display surface is placed at an angle with the desk surface so as to face the user. As is easily understood from this arrangement, the angle of a plane suitable for input is different from that of a plane suitable for viewing. There is a limit to the improvement of the input environment based on the addition of the touch panel function to one display.

Moreover, it is desirable to adapt the portable electronic apparatus to a particular situation so that the apparatus can be used easily in that situation. In general, the keyboard arrangement is specified. Accordingly, when the keyboard is utilized for a particular task, the fixed arrangement may disadvantageously be unsuitable for improving work efficiency. For example, the user may carry the notebook personal computer with him or her in order to process personal information. In this example, information stored in the notebook personal computer may be shown to a person different from the user. In some cases, a person different from the user may be allowed to perform a simple operation to execute a specified process on the basis of a procedure stored in a server on the network to which the notebook personal computer is connected, thus providing outputs constituting services. In other cases, subsequent business activities for articles or insurances may be based on these outputs. In such an example, not all the keys of the keyboard are required in the site where the user carries the notebook personal computer with him or her. Further, the client may provide incorrect input. If it is inconvenient to be able to use all the key inputs, the notebook personal computers manufactured by the current techniques offer no solutions. The possibility of incorrect operations can be reduced by allowing the client to operate only the previously described touch panel-installed display. However, the presence of the keyboard may hinder fundamental solutions. To solve this, a portable personal computer has been provided which has no keyboard and which is composed of an externally rectangular housing comprising a display and the minimum required input device such as a power supply switch. However, adapting the hardware only to a particular situation may degrade general-purpose properties. Specifically, when the user carries the apparatus to the client with him or her and if the client suddenly changes the contents of the operation, it is difficult to deal with this change with the above computer. Further, the user normally places paper flat on the desk when writing characters on the paper with a pencil. When reading a book, the user holds the book in his or her hand so that his or her line of sight is perpendicular to the print surface of the book. As is apparent from this behavior, the angle of a plane at which the user can easily input characters with his or her finger or a pen is different from that of a plane at which the user can easily read information displayed on the plane. This may disadvantageously tire the user. Moreover, for the electronic apparatuses, the user interface desirably meets users' individual requirements. That is, the input device needs to flexibly conform to the physical properties or preferences of users. It is well known that the size of each part of the human body varies. The input device such as a common keyboard or mouse has fixed dimensions. Consequently, a comfortable work environment cannot be realized unless the user prepares an input device of a size suitable for himself or herself. However, in the notebook personal computer, the keyboard is integrated with the main body. Thus, disadvantageously, the user cannot adjust the key pitch or arrangement.

The interface for the electronic apparatus can desirably provide a quieter environment. That is, when the user inputs characters from the keyboard, typing sounds occur. Accordingly, the keyboard is inconvenient for taking notes in a situation where making noise is not preferable, for example, in a library or during a class in school. It is thus desirable to enable input while maintaining a quiet environment.

BRIEF SUMMARY OF THE INVENTION

It is an object of the present invention to provide an electronic apparatus which is excellent in portability, operability, visibility, and reliability.

According to an aspect of the present invention, there is provided an electronic apparatus comprising:

a first display device comprising a first housing and a first display screen which is held in the first housing;

a second display device comprising a second housing and a second display screen which is received and held in the second housing, the second display screen comprising a sensor which generates a sensor output signal depending on an input on the second display screen;

a connecting mechanism configured to connect the first and second housings together and capable of adjusting an opening angle of the first housing with respect to the second housing;

a display processing section configured to display a first display image on the first display screen and a first interface image on the second display screen;

a determining section configured to determine an instruction to the interface image on the basis of the sensor output signal; and a control section configured to control the display processing section in response to the instruction to cause a second display image to be displayed in place of the first display image and control the display processing section in response to the instruction to cause a second interface image to be displayed in place of the first interface image.

According to another aspect of the present invention, there is provided a foldable display device comprising:

a first device having a first display screen to display application images;

a second device having a second display screen to display interface images and an input sensor provided around the second display screen to sense an input position of touching or a movement on the second display screen;

a connecting mechanism configured to arbitrarily set an angle of the first display screen of the first device and the second display screen of the second device and to be capable to be folded;

an input processor to converting an input position sensed by the sensor into an input data to the display processor, and a display processor to generate application images to be displayed on the first display screen and interface images to be displayed on the second display screen, wherein the display processor generates a first interface image indicating distinctly displaying the input position after receiving the input data on the second display screen, and generates a first application image reflecting the input data on the first display screen.

According to yet another aspect of the present invention, there is provided a portable computer, comprising:

a flat panel having a first display panel and a second display panel, that is foldable along a centerline and that a surface of the second display panel approaches to a surface of the first display panel when they are folded;

a touch panel sensor provided at least on a second display panel to detect a user's input operation;

a display processor to supply display data to the first display panel and the second display panel; and a display controller to control the display processor in at least two modes comprising, a first mode where the display processor supplies an application image to the first display panel while supplying an interface image to the second display panel so as to use the second display panel as an input device, and a second mode where an application image is divided into two part and one part of the application image is supplied to the second display panel and the other part of the application image is supplied to the first display panel so as to use the first and second display panels as a one extended screen.

BRIEF DESCRIPTION OF THE SEVERAL VIEWS OF THE DRAWING

FIG. 3 is a block diagram showing a driving circuit that drives a touch panel-equipped LCD panel of the notebook personal computer shown in FIG. 1;

DETAILED DESCRIPTION OF THE INVENTION

With reference to the drawings, description will be given of an electronic apparatus having a universal human interface according to an embodiment of the present invention.

Figure 1:
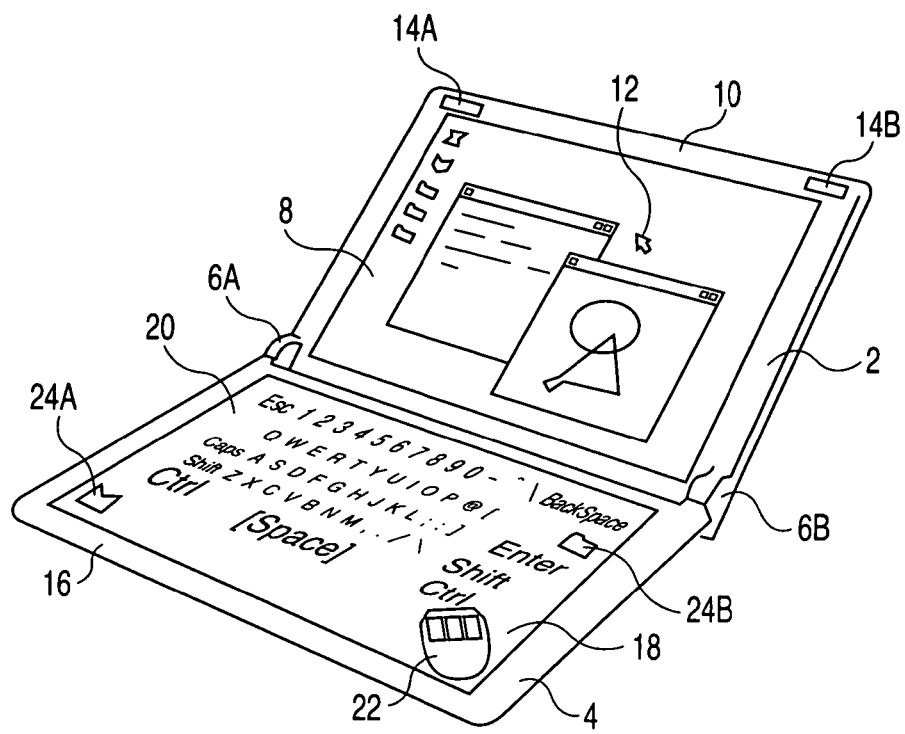
FIG. 1 is a perspective view schematically showing a notebook personal computer as an example of a portable electronic apparatus according to an embodiment of the present invention.

FIG. 1 is a perspective view schematically showing a notebook personal computer as an example of a portable electronic apparatus according to an embodiment of the present invention.

As shown in FIG. 1, the notebook personal computer is made portable by foldably connecting a first housing 2 and a second housing 4 together using hinges 6A and 6B and folding the first housing 2 over the second housing 4 to lay the first housing 2 on top of the second housing 4. Further, as shown in FIG. 1, the first housing 2 is opened with respect to the second housing 4 so that a user can operate the notebook personal computer while viewing the first housing 2 and the second housing 4. That is, the user can place the second housing 4 on a desk surface and use the hinges 6A and 6B to appropriately adjust the angle of the first housing 2 so that the user can easily view an LCD panel in the first housing 2.

The first housing 2 has the LCD (liquid crystal display) panel 8 installed in its frame 10 to display images, characters, and the like. A driving circuit (not shown) is stored in the housing 2 to drive the LCD panel 8. Further, in addition to the LCD panel 8, an antenna for wireless LAN or radio communication such as Bluetooth is stored in the first housing 2. The LCD panel 8 displays a pointer 12 used to select any of icons shown as images or characters. The pointer 12 can be used to make any of the icons active to operate the related application.

In the second housing 4, rubber pads 14A and 14B are applied to the surface of the frame 10 as a cushioning material so as to prevent the first housing 2 and the second housing 4 from being shocked when they are folded. Accordingly, the rubber pads 14A and 14B absorb an external shock applied when the notebook personal computer is folded or carried. This prevents the first housing 2 and the second housing 4 from being damaged by the shock.

The second housing 4 has a touch panel-installed LCD panel 18 installed in its frame 16. The touch panel-installed LCD panel 18 includes a pressure-sensitive touch panel laminated to an LCD panel (liquid crystal display device) used to display images, characters, and the like. The second housing 4 stores a driving circuit (not shown) that drives the LCD panel of the touch panel-installed LCD panel 18 and a detecting circuit (not shown) that detects an input to the touch panel. Further, the second housing 4 has a built-in motherboard on which a CPU and a memory are mounted, and a drive device such as an HDD. The housings 2 and 4 supply power to each other and exchange information with each other via a bundle of electric wires passing through the neighborhood of the center of a shaft of each of the hinges 6A and 6B.

The touch panel-installed LCD panel 18 displays a virtual keyboard 20 corresponding to a keyboard image that can be used to input characters or the like by providing key input as with common keyboards. That is, an input to the touch panel is replaced with a code or the like which is generated when the corresponding key of the common keyboard is depressed, on the basis of the relationship between the input and the corresponding display image. The code is then input to a CPU in the notebook personal computer main body, where the code is then subjected to software processing. Then, the resulting image is displayed on the LCD panel 8. In this manner, emulation of the mechanical keyboard may be implemented by a special electronic circuit that controls the touch panel-installed LCD panel. Alternatively, it may be implemented by processing executed by software such as firmware. The user may create the keyboard image in bitmap form. Further, the touch panel-installed LCD panel can be used as an interface in a form different from the keyboard as described later.

The touch panel-installed LCD panel 18 displays not only the virtual keyboard 20 but also a virtual mouse 22 operated similarly to a common mouse to move a pointer position or make any icon active. That is, an image corresponding to the mouse 22 is displayed in a screen on which the keyboard 20 is displayed. The user uses his or her hand to touch and depress a part of the touch panel corresponding to the displayed position of the virtual mouse 22, to move the virtual mouse 22. This results in a setting such that the entire touch panel is used as an area in which the virtual mouse can move. In this case, even if the virtual keyboard is depressed during the operation of the virtual mouse 22, this is not recognized as a key input. When the user's hand remains off the virtual mouse 22 for a specified time, the virtual mouse moves to the lower right of the touch panel-installed display 18, shown in FIG. 1, to wait for an operation. Then, an input can be provided to the virtual keyboard 20. Of course, the standby position of the virtual mouse 22 is not limited to the lower right of the touch panel-installed display 20 but can be arbitrarily set by the user. Further, by making the displayed virtual mouse 22 smaller while it is standing by than while it is being used, as in the case of the icons, it is possible to reduce the possibility that the virtual mouse 22 will interfere with an input area for the virtual keyboard 20. If the standing-by virtual mouse 22 is displayed as an icon, then tapping the icon enables the virtual mouse 22 to be displayed near the icon in the use-time size.

The following action may be taken instead of causing the virtual mouse 22 to stand by while it is not used: upon sensing the thenar eminence, hypothenar eminence, index finger, and middle finger of one hand touching the touch panel and moving over the touch panel 20 while maintaining the same positions, the computer may determine that the virtual mouse 22 is being operated. In this case, the virtual mouse is displayed on the touch panel-installed LCD panel 20 so that a pointer on the screen can be moved. Further, the computer can be allowed to determine, on the basis of the pressure of the finger, whether a button is being pressed or the finger is off the button, to perform a click operation. Further, when one of the fingers moves in a way that the distances from this finger to the thenar eminence and to hypothenar eminence change, the computer may determine that this input indicates that a wheel has been moved. In this manner, as in the case of the common mouse, an output from the virtual mouse is provided to the CPU in the personal computer main body, where it is subjected to software processing. The results of the software processing are displayed as an image on the LCD panel 8.

In this case, when the virtual mouse 22 moves onto the virtual keyboard 20, it may be displayed on top of the virtual keyboard 20 so as to appear translucent or opaque. Further, when the virtual mouse 22 or the virtual keyboard 20 is touched, the brightness, color, or image contrast of the touched input area may be changed depending on the intensity of the input to the touch panel. Furthermore, if any line or character is already displayed in an input area when the virtual mouse 22 or the virtual keyboard 20 is touched, the thickness of the line, the size of the character, or the font may be changed. A sound may be generated which corresponds to the virtual key displayed in the input area.

Further, the touch panel-installed LCD panel 18 can display other icons 24A and 24B and the like as required and also display images, characters, and the like without showing the virtual keyboard 20 similarly to the LCD panel 8. A combination of the LCD panel 8 and the LCD panel 18 provides a larger work area than with common personal computers. On the touch panel-installed LCD panel 18, the icons 24A and 24B may be displayed on top of another image. When displayed on top of another image, the icons 24A and 24B may be translucent or opaque.

In the above embodiment, the touch panel-installed LCD panel 18 senses a contact pressure on the basis of the contact area. However, obviously, the touch panel-installed LCD panel 18 may be able to sense the pressure exerted directly on a touch panel 18T. Similarly, the touch panel-installed LCD panel 18 may be able to electromagnetically sense a touch with the touch panel 18T. The electromagnetic type adopts a sensor that can detect the intensity of electromagnetic waves on the touch panel 18T to sense a touch on the basis of a change in intensity.

The second housing 4 is assembled in the following manner: the panel surface of the touch panel-installed LCD panel 18, installed in the second housing 4, is flush with the top surface of the frame 16 of the second housing 4 so that no step is formed between the panel surface of the LCD panel 18 and the frame 16 of the housing 14. Since there is almost no step between the surface of the LCD panel in the housing and the surface of the second housing, the movement of the user's hand is not hindered by steps at the ends of the panel when the virtual mouse is operated.

With the conventional notebook personal computer, the pointer moving all over the screen is operated by moving the user's finger in a small area such as the touch pad, which is at most several centimeters by several centimeters square. This is considered to be disadvantageous in the accuracy of operations. However, with such a notebook personal computer as shown in FIG. 1, an area almost equal to the size of the housing can be used as a pointing device. Consequently, operability is expected to be drastically improved.

In the embodiment shown in FIG. 1, the LCD panel 8 in the first housing 2 is not provided with any touch panel. However, it may be provided with a touch panel similarly to the LCD panel in the second housing 4.

If icons used to activate applications or indicating files, folders, or the like are arranged on the touch panel 18, it is possible to equally perform a series of operations for operating the keyboard and an operation for clicking any of the icons. This eliminates the need for a change in input path which is effected by, for example, taking the user's hand off the keyboard and operating the pointing device as with the common notebook personal computers.

Figure 2:
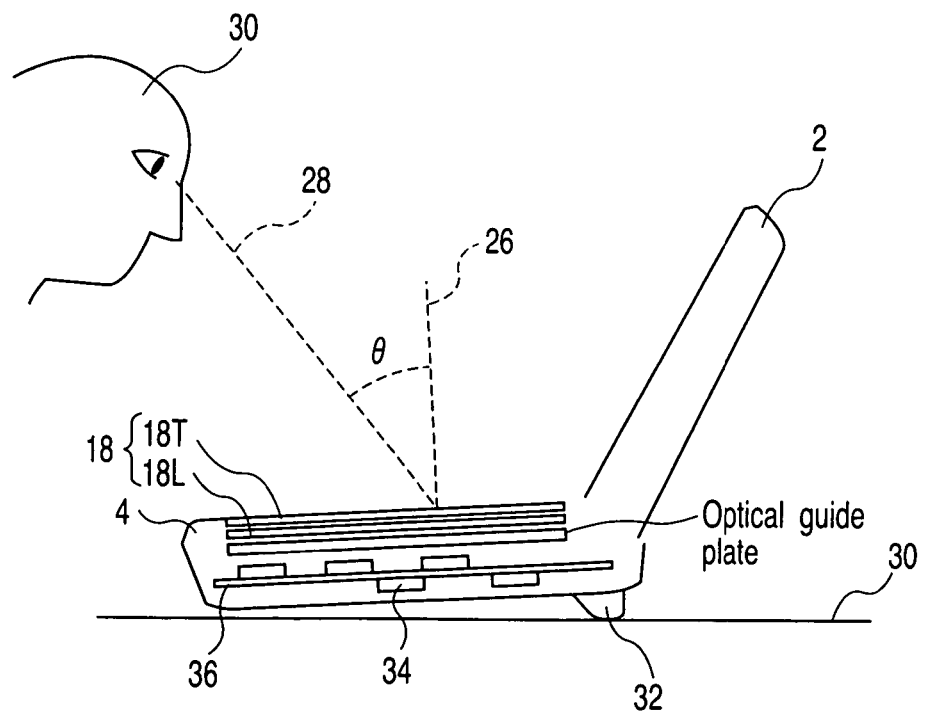
FIG. 2 is a sectional view schematically showing the internal structure of the notebook personal computer shown in FIG. 1.

When the notebook personal computer shown in FIG. 1 is used, the second housing 4, which houses a circuit board 36 provided with a semiconductor element 34, is placed on a desk surface 30 as shown in FIG. 2. Then, the angle of the LCD panel 8 is appropriately adjusted utilizing the hinges 6A and 6B so that the user can view the LCD panel 8 easily. If there is a large angle between the direction of the line of sight 28 of the user 30 and the normal 26 of the LCD panel 18, provided in the second housing 14, and external light incident on the panel 18 is reflected to make the display on the LCD panel 18 difficult to view, a tilt stand 32 can be used to adjust the angle. Adjustments with the tilt stand 32 are insufficient to set the angle of the second housing 4 set as freely as the holding angle of the first housing 2.

The touch panel-installed panel 18 is normally composed of a touch panel 18A stacked on a liquid crystal display section 18B. If the line of sight 28 of the user 30 coincides with the direction of the normal 26, the depressed position of the touch panel 18A matches a display position on the liquid crystal display section 18B. However, if there is a certain angle $\theta$ between the line of sight 28 of the user 30 and the direction of the normal 26, the depressed position of the touch panel 18A does not match the display position on the liquid crystal display section 18B. The depressed position is misaligned with the display position. To deal with this problem, the relationship is preferably established such that the input position on the touch panel deviates from the position corresponding to the display section 18B. That is, with the certain angle θ between the line of sight 28 of the user 30 and the direction of the normal 26 taken into account, if a position on the touch panel 18A lying on an extension of the line of sight is depressed, an instruction is preferably given on a display position in the liquid crystal display section 18B also lying on the extension of the line of sight 28.

In this case, the touch panel 18A and the liquid crystal display section 18B are driven using, by way of example, such a driving arrangement as shown in FIG. 3. With the circuit shown in FIG. 3, when the notebook personal computer is powered on, an image display command is provided to a graphics s CPU 40. In response to the command, the CPU 40 transfers image data on the virtual keyboard 20 from a graphics s ROM 42 to a frame memory 44. The frame memory 44 then expands the transferred image data on the virtual keyboard 20 into a bitmap, which is provided to a display circuit section 46 on a line-by-line basis. The display circuit 46 processes and converts the image line signal into a row driving signal and a column driving signal. The display circuit 46 then supplies the row and column driving signals to a row driver 48 and a column driver 50, respectively. The drivers 48 and 50 convert the respective driving signals into signals driving the display signal in accordance with the driving signals. The LCD display section 18B displays an image of the virtual keyboard 20. The image display command provided to the graphics s CPU 40 contains information on the keyboard size and arrangement of the virtual keyboard 20. In accordance with the image display command, the CPU 40 processes and converts data from the ROM 42 into appropriate image data and then supplies the image data to the frame memory 44. Therefore, after the default virtual keyboard 20 is displayed on the LCD display section 18B, it can be utilized to provide the CPU 40 with an instruction on a change in the size and arrangement of the virtual keyboard 20.

Figure 4:
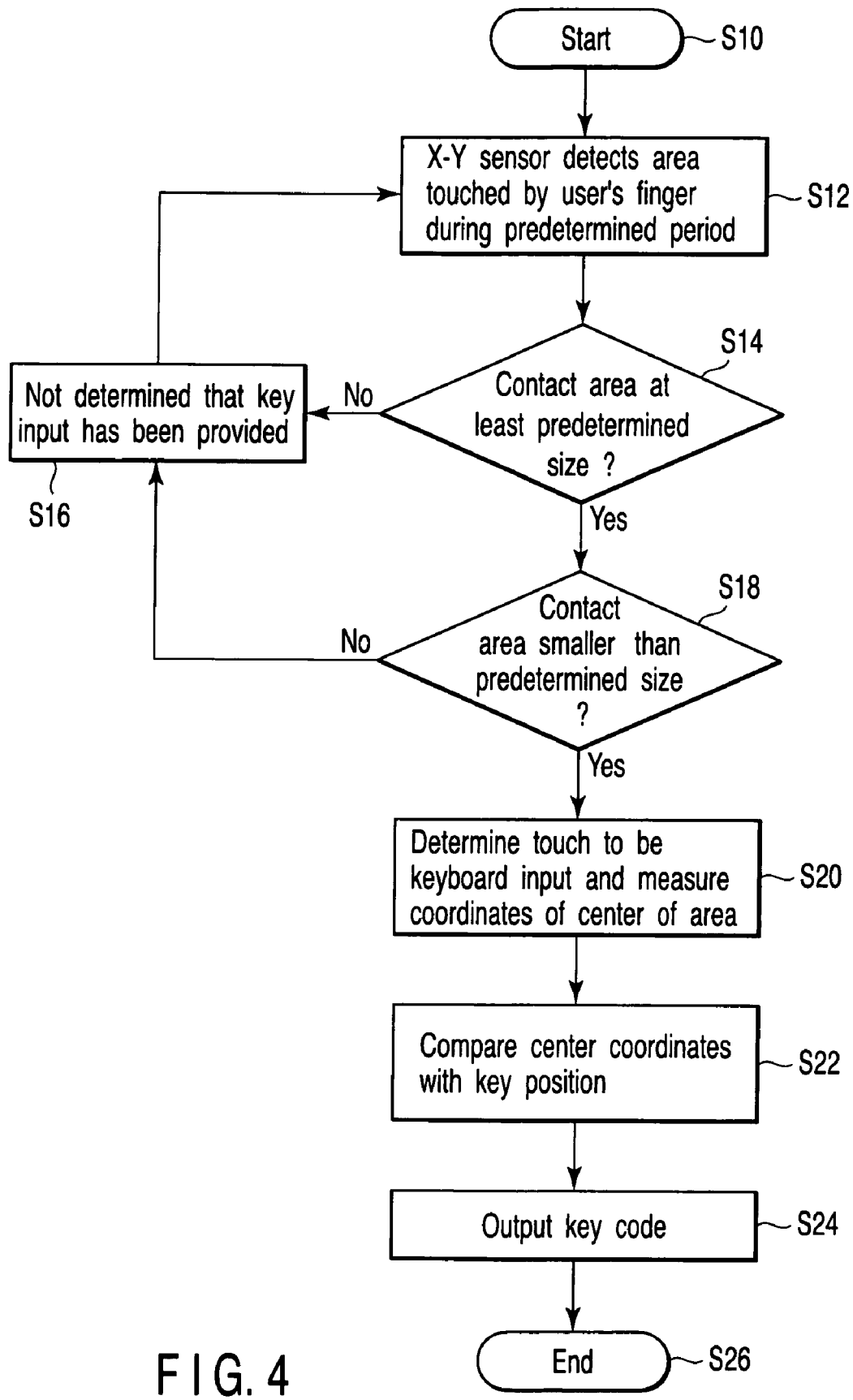
FIG. 4 is a flowchart showing control with which a key code is output in response to an input to a virtual keyboard displayed on the touch panel-installed LCD panel of the notebook personal computer shown in FIG. 1.

With reference to FIGS. 3 and 4, description will be given of a control flow in which a key code is output in response to a certain input to the virtual keyboard 20.

The virtual keyboard 20 is displayed and its control is started (step S10). In this case, when the user's finger touches the touch panel 18A on the LCD display section 18, on which the virtual keyboard 20 is displayed, an X coordinate sensor 54 and a Y coordinate sensor 56 detects the coordinates of the touched area, for example, the area shown at reference numerals 52A and 52B in FIG. 3, as shown in step S12. The coordinates detected by the X coordinate sensor 54 and Y coordinate sensor 56 contain all the pixel coordinates in the area touched by the user's finger, the pixel coordinates corresponding to pixels in the LCD display section 18B. A coordinate processing section 58 is supplied with an X and Y coordinate detection signals specifying the pixel coordinates. If the area touched by the user's finger during an adjustable predetermined period is equal to or larger than a predetermined size as shown by reference numerals 52A or 52B or is smaller than the predetermined size as shown in steps S14 and S15, the coordinate processing section 58 determines that the touch is a keyboard input to determine the central coordinates of the touched area as shown in step S20. Then, the graphics s CPU 40 compares the central image with the virtual keyboard 20 as shown in step S22. The graphics s CPU 40 then outputs the key code of the key corresponding to the central image and also outputs a signal for a change in the color or brightness of the key corresponding to the central coordinates, to the frame memory 44. The color or brightness of the key on the virtual keyboard 20 corresponding to the key input is changed and the screen indicates that the input has been provided. Likewise, if the user's finger touches the virtual keyboard 20 to provide the next input, steps S10 to S26 are similarly repeated.

In step S14, when the area of the touch panel 18A touched by the user's finger during the predetermined period is smaller than the predetermined size as shown by reference numeral 52C, for example, when the user's finger inadvertently touches the touch panel 18A, the area is smaller than the predetermined size. Accordingly, the coordinate processing section 58 does not determine that a keyboard input has been provided as shown in step S18. Thus, the coordinate processing section 58 does not output the signal for key central coordinates to the graphics s CPU 40. The area touched by the user's finger is smaller than the predetermined size when, for example, the finger remains placed on the keyboard, for example, at a home position for a period longer than in the case of a keyboard input.

Further, in step S18, if the area of the touch panel 18A touched by the user's finger during the predetermined period is larger than the predetermined size and exceeds the limit beyond which the input is determined to be abnormal, as shown by reference numeral 52D, for example, if the user's finger touches the touch panel 18A in such a way that it strokes the panel, then the coordinate processing section 58 does not determine that a keyboard input has been provided as shown in FIG. 18. Thus, the coordinate processing section 58 does not output the signal for key central coordinates to the graphics s CPU 40.

If the virtual mouse 22 is displayed, when the notebook personal computer is powered on, the image display command is similarly provided to the graphics s CPU 40. In response to the command, the CPU 40 transfers image data on the virtual mouse 22 from the graphics s ROM 42 to the frame memory 44 together with the image data on the virtual keyboard 20. The frame memory 44 then expands the transferred image data on the virtual mouse 22 into a bitmap, which is provided to the display circuit section 46 on a line-by-line basis. The display circuit 46 processes and converts the image line signal into a row driving signal and a column driving signal. The display circuit 46 then supplies the row and column driving signals to the row driver 48 and the column driver 50, respectively. The drivers 48 and 50 convert the respective driving signals into signals driving the display signal in accordance with the driving signals. The LCD display section 18B displays an image of the virtual mouse 22. The image display command provided to the graphics CPU 40 contains the information on the keyboard size and arrangement of the virtual mouse 22. In accordance with the image display command, the CPU 40 processes and converts the data from the ROM 42 into appropriate image data and then supplies the image data to the frame memory 44. Therefore, after the default virtual keyboard 20 is displayed on the LCD display section 18B, it can be utilized to provide the CPU 40 with an instruction on a change in the size and arrangement of the virtual mouse 22.

Button operations with the virtual mouse 22 are treated similarly to key inputs. Depressing the area of a button is determined to be a click. That is, if the user's finger is simply placed on the button with no instruction on a click given, the operation is not determined to be a click because the area in which the user's finger is placed is smaller than the predetermined size as in the case of key inputs. To move the virtual mouse 22 to change the pointer position, a plurality of fingers are placed and moved in order to move the virtual mouse 22.

Accordingly, the area touched by the plurality of fingers is detected. Movement of the virtual mouse 22 is determined when the following state is sensed: the area in which the user's fingers are placed is equal to or larger than the predetermined size and this area is moved with time. In this case, the pointer moves with this movement, and the movement of the pointer corresponds to the movement of a predetermined position in the area specified by the plurality of fingers. That is, when the predetermined position in the area is moved, the pointer is moved the same distance as that the predetermined position moves, in the same direction as that of the movement of the predetermined position. Further, when the user takes his or her finger off the virtual mouse 22, the virtual mouse 22 is returned to the home position. Specifically, when the finger remains off the touch panel-installed display 18 for a predetermined period in order to change the manner of touching the virtual mouse 22, the coordinate processing section 58 determines that the coordinates of the area touched by the finger have disappeared for the predetermined period. The coordinate processing section 58 thus instructs the graphics CPU 40 to suspend the operation of the virtual mouse 22. Therefore, the graphics CPU 40 executes a process of returning the virtual mouse 22 to the home position, in the example shown in FIG. 3, the area in the lower right of the touch panel-installed panel 18.

In response to a keyboard input, the graphics CPU 40 outputs the signal for the key central coordinates to the CPU (not shown) in the notebook personal computer as a command corresponding to the input key or the like. The CPU then executes an ordinary process corresponding to the key input. Likewise, for a mouse output, the graphics CPU 40 outputs a command corresponding to a mouse operation to the CPU in the notebook personal computer. The CPU then executes an ordinary process corresponding to the mouse input. For a process realized using another icon, the CPU in the notebook personal computer executes a process corresponding to the input command.

Figure 5:
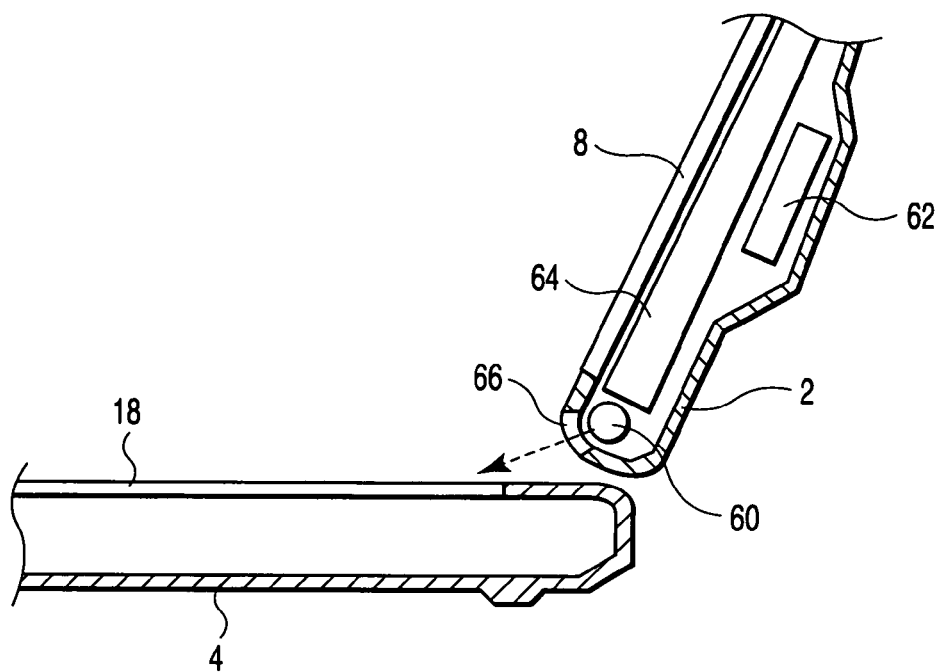
FIG. 5 is a sectional view schematically showing the structure of an illuminating mechanism incorporated into the notebook personal computer shown in FIG. 1.

In the notebook personal computer shown in FIGS. 1 and 2, the LCD panels 8 and 18 are illuminated using one light source as shown in FIG. 5. Specifically, as shown in FIG. 5, which is a sectional view of a part of the notebook personal computer, the first housing 2 has an FL tube 60 and a built-in circuit 62 such as an inverter which supplies a high voltage to the FL tube 60 to cause it to emit light. The LCD panel 8 is of a transmission type illuminated by the FL tube 60 from behind. The LCD panel 18 in the second housing 4 is designed to be of a reflection type illuminated by the FL tube 60 from the front. Accordingly, the FL tube 60 is placed in the first housing 2 and in proximity to the second housing 4. A light guide plate 64 is placed behind the LCD panel 8 to guide an illumination beam. A window 66 is formed in the first housing 2; the window 66 is closed with a transparent member that guides an illumination beam from the FL tube 60 to a surface of the LCD panel 18. An illumination beam from the FL tube 60, placed between the window 66 and the light guide plate 64, is introduced into the light guide plate 64, which then guides the illumination beam to the rear surface of the LCD panel 8. Consequently, the LCD panel 8 is illuminated from its rear surface to display an image on itself. Further, an illumination beam from the FL tube 60 is guided to the front surface of the LCD panel 18 via the window 66 as shown by the arrow in the figure. The illumination beam is guided to the interior of the LCD panel 18 and then reflected. The reflected beam allows the user to recognize an image formed on the LCD panel 18. This structure is provided with the one FL tube 60 and the one inverter circuit 62, which drives the one FL tube 60. This structure can thus make it possible to reduce power consumption compared to a structure in which an FL tube and its driving circuit are provided in each of the housings 2 and 4. The space for parts arrangement can also be saved. It should be noted that the hinges connecting the first and second housings 2 and 4 together are omitted in FIG. 5.

Figure 6:
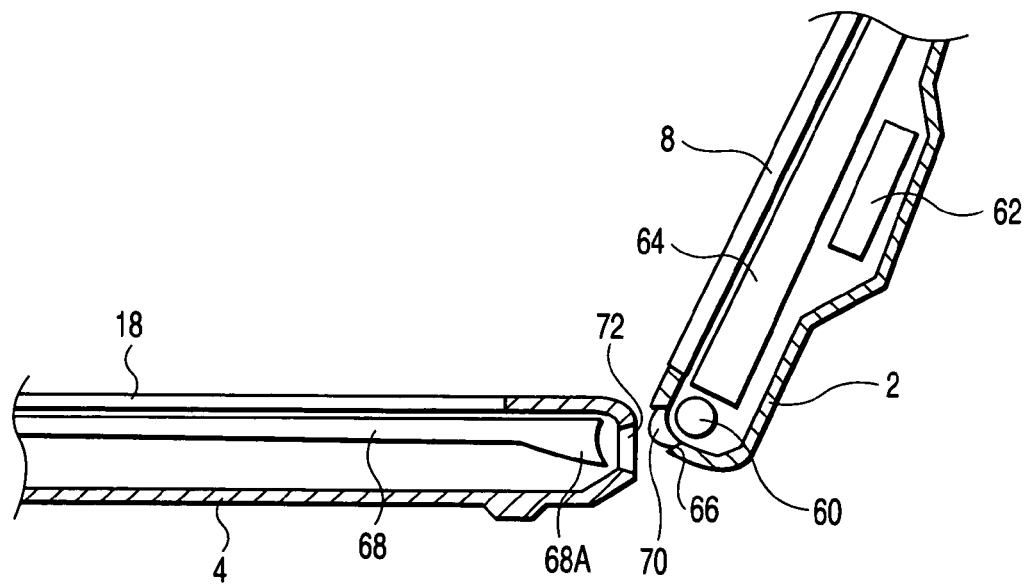
FIG. 6 is a sectional view schematically showing another structure of the illuminating mechanism incorporated into the notebook personal computer shown in FIG. 1.

In the illumination system shown in FIG. 5, the LCD panel 18 is of the reflection type illuminated from the front. However, the LCD panel 18 may be of the transmission type illuminated from behind as shown in FIG. 6. Specifically, as shown in FIG. 6, a light guide plate 68 is provided behind the LCD panel 18. A window 72 is formed in the first housing 4 opposite a light incident portion 68A of the light guide plate 68; the window 66 is closed with a transparent member. The window 72 lies opposite the window in the housing 2 in which a lens 70 is fitted. The lens 70 in the housing 4 suppresses the leakage of light from the gap between the hinges 6A and 6B to the exterior. In the housings 2 and 4 adopting such an illumination system, rotating shafts of the hinges 6A and 6B are placed below the hinge position in the structure shown in FIG. 5. When the first housing 5 is opened, the lower end of the first housing 2 is placed below that in the structure shown in FIG. 5.

In the illumination system shown in FIG. 6, an illumination beam from the FL tube 60, housed in the first housing 2, is guided by the light guide plate 64 inside the first housing 2 and condensed by the lens 70. The illumination beam is thus guided to the window 72. The condensed beam introduced via the window 72 is lead to the light guide plate 68 inside the second housing 4 via the light incident section 68A. The beam is then transmitted through the light guide plate 68 and then from the light guide plate 68 to the LCD panel 18. Therefore, the user views an image displayed on the LCD panel 18.

The illumination system shown in FIG. 6 is provided with the one FL tube 60 and the one inverter circuit 62, which drives the one FL tube 60. This illumination system can thus make it possible to reduce power consumption compared to a structure in which an FL tube 60 and its driving circuit are provided in each of the housings 2 and 4. The space for parts arrangement can also be saved.

With reference to FIGS. 5 and 6, description has been given of a method of illuminating the two LCD panels 8 and 18 using the one FL tube 60. However, the use of a light source such as a LED which does not require any inverter solves the problem for the space for the light source power source and makes it possible to reduce power consumption. This enables an illumination light source to be provided in each of the two LCD panels 8 and 18. It is thus possible to use a self-luminescent display device such as an EL display panel which does not require any illumination light source.

The software in the personal computer may be set as follows. If a stylus or the user's finger has not touched the input device such as the touch panel 18T for a preset time period, the display by at least one of the first display device 8 and second display device 18 is stopped to turn down or put out the illumination by a backlight, a front light, or the like.

In the description of the touch panel-installed panel 18, shown in FIGS. 1 and 2, the size of the area depressed by the user's finger is in proportion to the pressure of the touch. The touch panel 18T may be of an arbitrary type provided that it can sense pressure. A key input is determined on the basis of the pressure of the finger touch.

To ensure the user's input, it is possible to change the display color of the virtual key, increase the brightness of the key, or make a key input sound when a key input is provided. Further, even if the input is insufficient to be recognized as a key input, the display color or brightness of the key may be slightly changed to provide feedback to the user to inform him or her that the touch panel 18T is sensing pressure. In some places such as a library and some situations such as note taking at a meeting or lecture, it is inappropriate to generate sound. Accordingly, the user can set whether or not to generate a key input sound. The sound may correspond to the key position, for example, depressing the key "A" may result in the corresponding sound, and depressing the key "B" may result in a beep. Alternatively, a pip may be generated which has a frequency varying depending on the key position. Alternatively, typing sounds may be generated using recorded typing sounds of a conventional mechanical keyboard or a typewriter.

Figure 7:
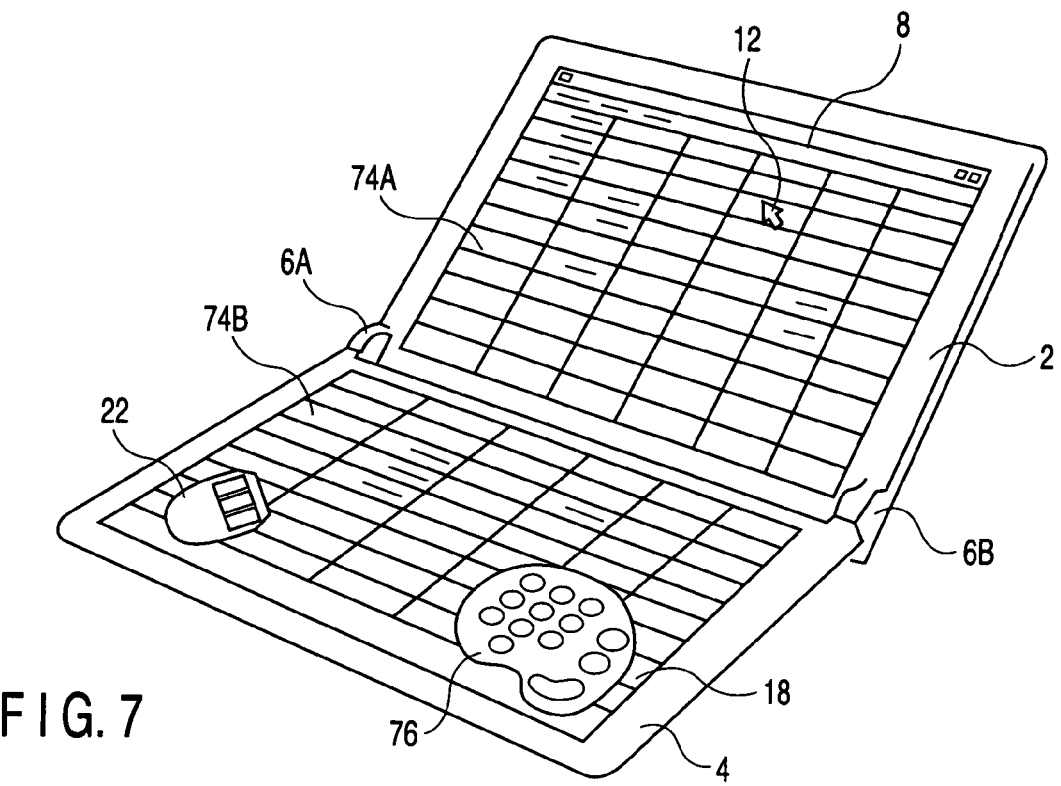
FIG. 7 is a perspective view schematically showing how a document is displayed on two screens according to another usage of the notebook personal computer shown in FIG. 1.
Figure 8:
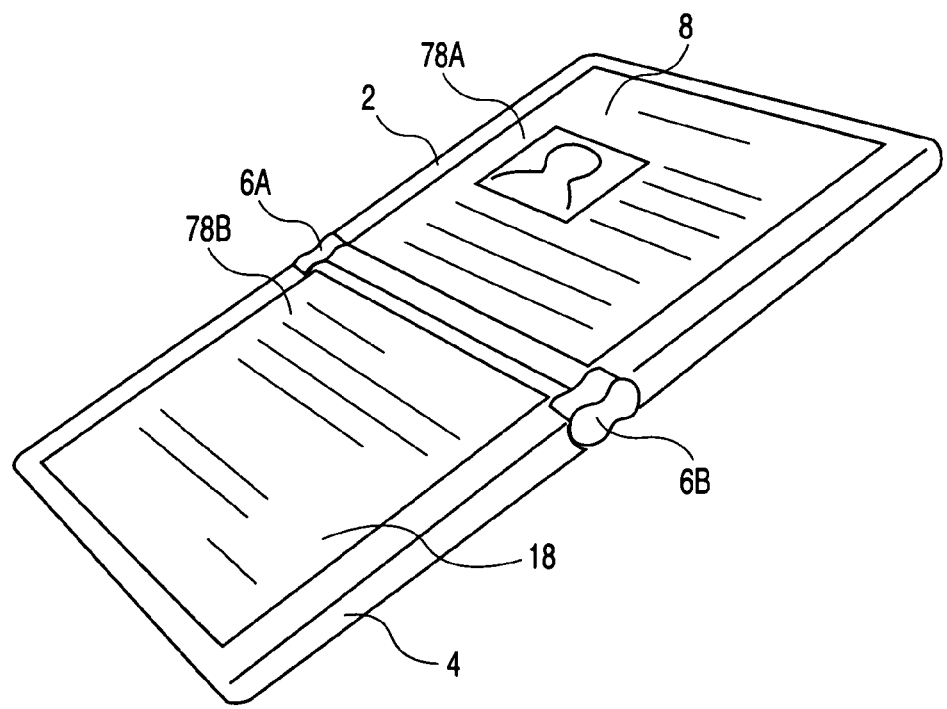
FIG. 8 is a perspective view schematically showing an interface display according to yet another usage of the notebook personal computer shown in FIG. 1.

In the notebook personal computer shown in FIGS. 1 and 2, both of the two LED panels 8 and 18 may be used as output screens to continuously display data across the two screens as shown in FIGS. 7 and 8. That is, when the personal computer is used to perform an operation for which viewing displayed information is more important than key inputs, the display on the keyboard may be reduced or deleted so that the data succeeding the contents of the display in the LCD panel in the first housing 2 can be displayed on the LCD panel 18 in the second housing 4. Alternatively, data associated with the contents of the display in the LCD panel in the first housing 2 can be displayed on the LCD panel 18 in the second housing 4. FIG. 7 shows an example in which continuous spread sheets 74A and 74B are displayed across the two screens. In the example shown in FIG. 7, when numbers must be input, a pad-like virtual key area 76 can be displayed which shows the minimum required keys such as numeric keys, an addition, subtraction, multiplication, and division symbol keys, an enter key, and a delete key. The position and rotating angle of the pad-like virtual key area 76 can be adjusted so as to facilitate inputs by dragging any of the corners of the pad with the user's finger. To move the pad with one point on the pad kept depressed, the pad can be moved. To move the pad with a plurality of points on the pad depressed, the pad can be rotated by associating the movement of the center of gravity of the point group with the movement of the pad and moving the pad with respect to the center of gravity of the point group.

FIG. 8 shows an example in which a document is displayed using the two screens. For example, each page of a vertically long document can be displayed all over the screen of the display device by opening the hinges 6A and 6B through an angle of about 180° so that display screens 78A and 78B of the housings 1 and 2 face in almost the same direction; for example, the vertically long document is created on the assumption that it is to be printed on A4-sized sheets. This enables the document to be easily read and reduces the amount of printing on paper intended to allow the document to be read rather than to, for example, store the document. This reduces the wasteful consumption of global resources. FIG. 8 shows the example in which the display surfaces are at almost the same height, that is, the two display surfaces are on almost the same plane. However, depending on the structure of the hinges 6A and 6B, the display surfaces need not be at the same height and may instead have almost the same normal direction.

In addition to the methods using the two screens for display as described above, various other methods are possible; a document or an image file is corrected by checking an uncorrected and corrected documents or files displayed on the respective screens; a plurality of thumbnail images are displayed on the LCD panel in the second housing so that the user can use his or her finger or the like depress any of the positions at which the thumbnail images are displayed to display an enlarged image on the first screen; or a part of a screen displayed on the LCD panel in the first housing is enlarged and displayed on the LCD panel in the second housing so that the user can view the enlarged screen to make detailed specifications concerning the areas in strings or the areas in the screen. When continuous information is displayed on the LCD panels, it is possible to display duplicate information in a display portion of the two LCD panels near the hinges 6A and 6B, to omit the information corresponding to the physical gap between the LCD panels from the display, or to simply divide the displayed information at the ends of each LCD panel.

The user may intentionally switch between provision of a key input and viewing of displayed information. However, the display state of the two screens may automatically be changed depending on the state of the user's hand with respect to the touch panel. For example, if the user's hand has not touched the touch panel for at least a predetermined time, the display screen may be enlarged so as to cover the entire two screens with the display of the keyboard deleted. When the user places his or her hand in the place where the keyboard is displayed in such a way that the user pads the keyboard, that is, when the user places his or her fingers at the two points corresponding to the "F" and "J" keys, the computer may determine that the user is to operate the keyboard on the basis of the form of the user's fingers touching the touch panel. The computer may then switch to the display of the keyboard.

By thus appropriately assigning the two screen areas to output or input, it is possible to obtain a large display screen even in a small-sized portable personal computer. Further, when an input is to be provided, almost the same area as that in a notebook personal computer with a common mechanical keyboard can be used as an input interface by assigning the screen to the virtual keyboard as required.

If the keyboard has not been operated for at least a specified time, then for example, information succeeding the screen display in the first housing 2 is displayed in the second housing 4. If the user has not operated the keyboard for a further extended time, both screens displayed in the first housing 2 and second housing 4 may be deleted or such a screen saver as displays moving images or characters may start operation.

Since the virtual keyboard or the like is displayed at the same position for an extended time, the image displayed on the LCD panel 18 in the second housing 4 may be dimmed in a shorter time than that displayed in the first housing 2. Alternatively, the screen saver may be operated. Further when different systems are adopted for the display panel 8 in the first housing 2 and for the display panel in the second housing 4, the amount of time before the screen saver starts operation may be determined on the basis of the lifetimes of the display devices 2 and 4.

The user may change the functions and display manners of the displayed virtual keys. The user can also make a setting such that, for example, shortcut icons for activating applications can be used directly as functions of the keyboard. Further, the user may switch between keyboards for different districts such as a Japanese keyboard, an English keyboard, and a Japanese syllabary order keyboard without changing the hardware. The keyboard arrangement may be varied depending on the type of the user; that is, it is possible to determine whether or not to provide numeric keys, whether or not to provide a control key and a shift key in both right and left of the screen, whether a new line key is vertically or horizontally long, whether or not to provide function keys.

By displaying only the minimum number of keys required for a particular operation as virtual keys, it is possible to prevent the user from unintentionally touching an unwanted key to perform an unintentional operation. This is also effective in associating a limitation on the user's authority with the displayed keyboard arrangement to more clearly distinguish the authority of a user of a personal computer used for a particular application from that of the administrator of the personal computer, thus improving the security for applications intended for unspecified number of the general public, for example, the security of a system for guiding transportation or of terminals provided at Internet cafes.

The personal computer shown in FIGS. 1 and 2 has a smaller number of movable portions than a keyboard on which a large number of mechanical switches are arranged. The personal computer is thus expected to have improved reliability and allows its keyboard to be easily protected from dust or drips. In contrast to dust-proofing, in which the apparatus is protected from external dust, when the keyboard id used in a semiconductor plant, dust may be collected in the keyboard, which has a complicated structure or the collected dust may scatter. Further, mechanical movement may cause parts to rub against each other to generate dust. The present invention suppresses the accumulation, scattering, and generation of dust.

Furthermore, when for example, the user carries a conventional notebook personal computer with him or her, if the folded personal computer is subjected to a high external pressure or members such as the housings are bent by vibration or a shock, traces of the corners of key tops may be left on the screen. However, the personal computer according to the present invention shown in FIGS. 1 and 2, the planar screens contact each other at a radius of curvature far larger than that of the corners of the key tops, thus advantageously preventing the screens from being damaged.

A switch is provided which is used to determine that the two housings 2 and 4 are closed so that a process for invalidating inputs to the touch panel can be executed when the housings 2 and 4 are closed. This process can prevent the computer from malfunctioning when the computer with the housings closed is subjected to an external pressure. Further, by recording inputs to the touch panel while the housings are closed, it is possible to help find the cause of damage to the LCD panel or housings such as an excessive pressure.

Figure 9:
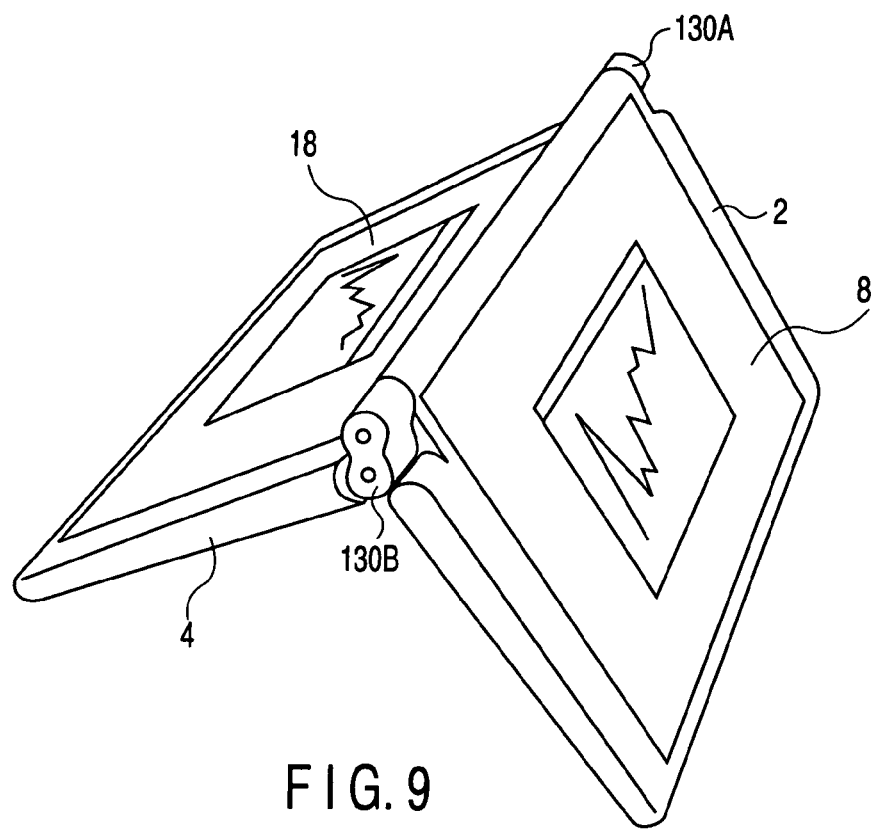
FIG. 9 is a perspective view schematically showing usage of a notebook personal computer as an example of a portable electronic apparatus according to another embodiment of the present invention.

FIG. 9 shows a notebook personal computer comprising two-rotating-shaft hinges 130A and 130B each having two rotating shafts. The two housing 2 and 4 can be closed so that the LCD panels 8 and 18 sit opposite each other or that both LCD panels 8 and 18 face outward. The user can operate the personal computer on one of the LCD panels 8 and 18 while checking the state of the operation on the other LCD panel, by standing the LCD panels 8 and 18 on a desk between the housings 2 and 4 so that the maximum opening angle (at least 180°; for example, 270°) is set between the second housing 4 and the first housing 1 and that the LCD panels 8 and 18 both face outward and form the character Λ (capital lambda). The notebook personal computer used in such a form comprises a plurality of rubber feet at positions (not shown) where the housings 2 and 4 contact the desk surface when the LCD panels are stood on the desk while adjusting hinge angle so that the panels form the character Λ. The rubber feet are exposed from sides of the closed housings when the user carries the computer with him or her. The rubber feet can thus function as cushioning members when the apparatus is dropped owing to carelessness or the like.

A notebook personal computer of such a structure can be used for applications such as presentations for a small number of people. For example, the operator views information including detailed data relating to the presentation, while the viewers see only slides. Alternatively, both parties can view the same screen or mirrored images. In this case, when mirrored images are displayed, a character font is not mirrored, and other images are mirrored. For inputs, the following usage is possible: the operator can freely change data, while the viewers can provide only limited inputs. When the personal computer according to the embodiment of the present invention is used in this form, the rotating angle of the hinges 130A and 130B may be used to switch between the display of a side of the screen closer to the hinges as the top and the display of a side of the screen farther from the hinges 130A and 130B as the top. Further, the personal computer may comprise a sensor that senses the direction of gravity so as to automatically switch the top and bottom of the display screen regardless of the angle of the hinges 130A and 130B or the placement of the personal computer.

Figure 10:
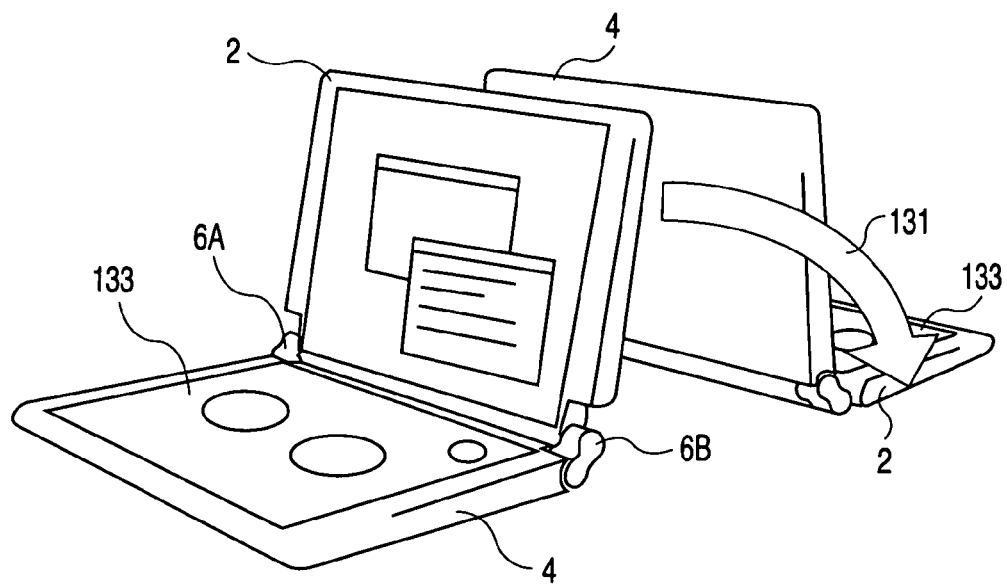
FIG. 10 is a perspective view schematically showing usage of a notebook personal computer comprising a gravity sensor as a portable electronic apparatus according to yet another embodiment of the present invention.

If the personal computer comprises a gravity sensor, even when, as shown in FIG. 10A, the first and the second housings 2 and 4 are rotated around the hinges 6A and 6B as shown by arrow 131, without changing the angle of the hinges 6A and 6B, on a table such as a desk on which the personal computer is placed, to change the positional relationship of the first and second housings 2 and 4 with the desk, the plane almost parallel to the desk surface is switched to the input interface 133, whereas the plane standing from the desk surface is switched to the display surface. This makes it possible to always provide a fixed input and display environment for the user regardless of the installation of the personal computer. This operation is not limited to the hinges 6A and 6B each having two rotating shafts.

Figure 11A:
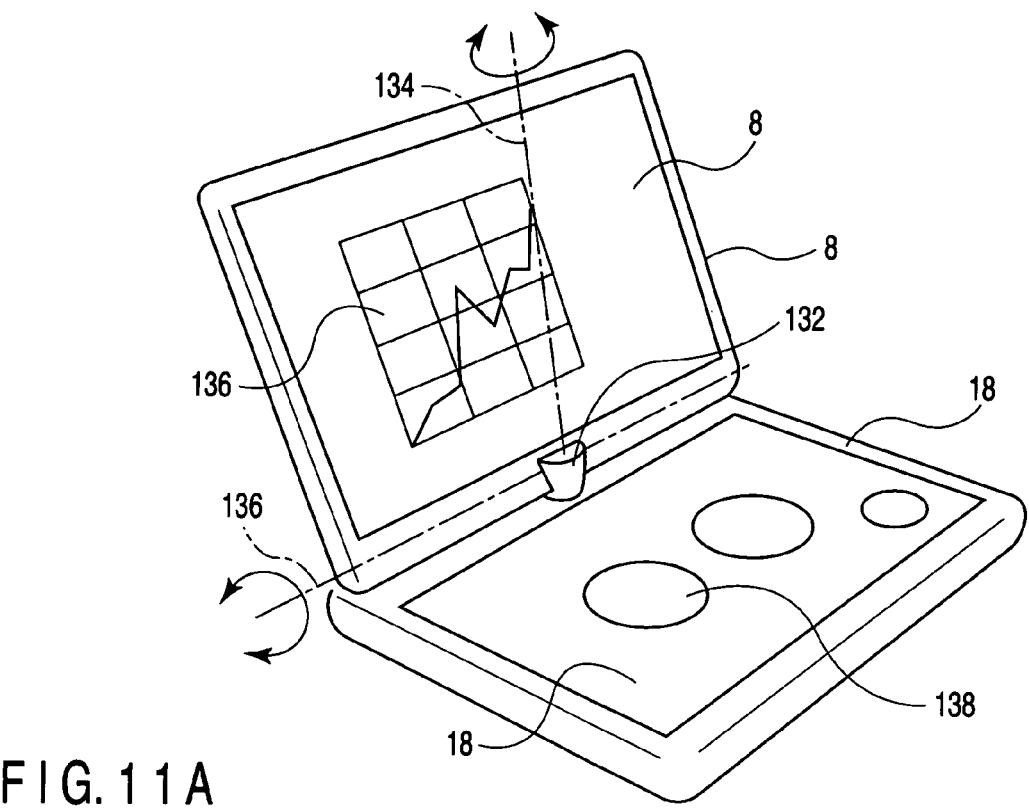
FIGS. 11A and 11B are perspective views schematically showing usage of a notebook personal computer as an example of a portable electronic apparatus according to still another embodiment of the present invention.
Figure 11B:
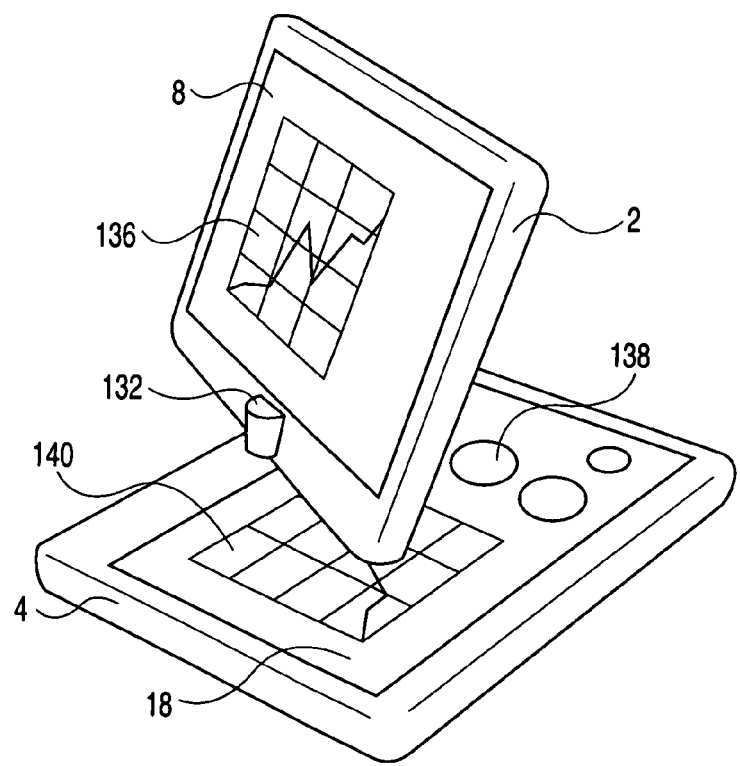

FIGS. 11A and 11B shows a personal computer in which the first housing 2 and the second housing 4 are connected together using a hinge 132 having two rotating shafts. The hinge 132 has a first shaft 134 extending along the normal direction of the display surface of the second housing 4 and a second shaft 136 which can tilt the first housing 2 with respect to the second housing 4 and which is orthogonal to the first shaft 134 and parallel to the display surface. In a presentation application similar to that shown in FIG. 9, when the user, that is, the presenter operates the computer while viewing both display panels 8 and 18 as shown in FIG. 11A, the display panel 8 in the first housing 2 displays an image 136 such as a table or a graph, while the display panel 18 in the second housing 4 displays an operational interface 138. When the presenter directs the display panel 8 in the first housing 2 toward presentees located opposite the presenter, the display panel 18 in the second housing 4 is provided, during the rotation of the hinge 132, with a screen 140 similar to the one 136 displayed on the display panel 8 in the first housing 2 and an operational interface 142 having a reduced size as shown in FIG. 11B. Such display for presentation applications enables the presenter to make presentation using the same screens 136 and 140 while having conversations with the presentees.

Figure 12:
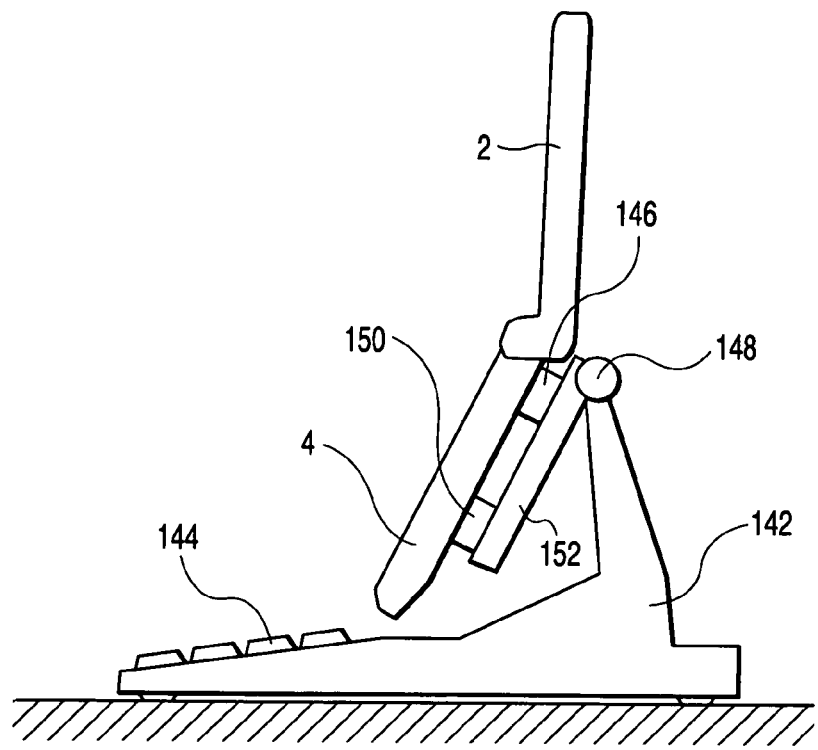
FIG. 12 is a perspective view schematically showing another usage of the notebook personal computer shown in FIG. 1.

FIG. 12 shows an example in which the personal computer shown in FIGS. 1 and 2 is installed on a stand 142 with a keyboard so as to be used in a desktop environment. In a mobile environment, the unitary personal computer is preferably provided with a larger screen and a human interface with a higher degree of freedom. However, in the desktop environment, a larger screen is given top priority. An external keyboard 144 or an external input device (not shown) such as a touch panel is preferably connected to the personal computer so that the personal computer can offer two screens; the external input device serves as a keyboard 144. As shown in FIG. 12, the personal computer main body is supported by the stand 142 on a support plate 152 on which a cushion member 150 is provided. When the personal computer main body is fixed to the stand 142, the external input device or a power supply connector is connected to the personal computer main body. The stand 142 has a function called a port replicator or docking station. A docking connector 146 is placed in the connection between the stand 142 and the personal computer. Accordingly, the second housing 4, into which a motherboard is incorporated, is connected to the stand 142. A portion of the stand 142 to which the personal computer is fixed is preferably rotatable. As shown FIG. 12, the LCD panel 8 in the first housing 2 and the LCD panel 18 in the second housing 4 may be arranged vertically in parallel so as to form a continuous screen. Alternatively, a rotary joint 148 may be rotated to arrange the LCD panels horizontally in parallel so as to form a continuous screen. The rotary joint 148 has a rotating shaft near the hinges of the personal computer so that even when the personal computer is rotated, the two screens are arranged at almost an equal distance to the user. In FIG. 12, the keyboard 144 and the stand 142 are integrated together. The keyboard 144 and the stand 142 may be separately connected to the personal computer.

The LCD panels 8 and 18 may be arranged either vertically or horizontally in parallel. Preferably, the personal computer comprises a sensor that senses gravity so that information displayed on the screen including the virtual keyboard can be appropriately rotated depending on the sensed direction. This enables images to be always displayed in the correct direction with respect to the user. Such a configuration enables the screen and the input device to be appropriately arranged for each scene used in both desktop and mobile environments.

Figure 13:
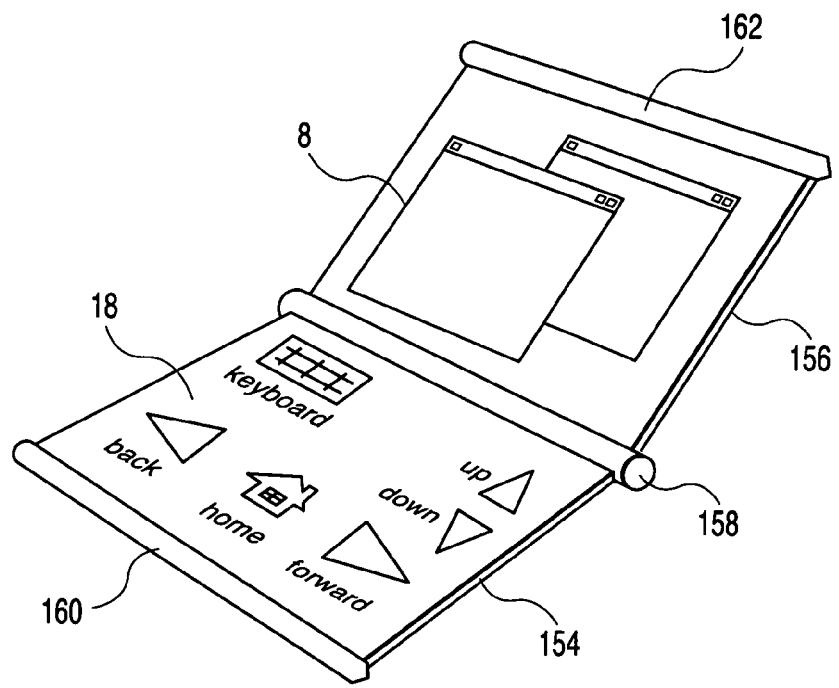
FIG. 13 is a perspective view schematically showing a notebook personal computer comprising a silicon on glass structure as an example of a portable electronic apparatus according to further another embodiment of the present invention.

A screen display device and a processing circuit can be constructed on the same glass substrate by using a technique for forming an LSI on a glass substrate, the technique being called silicon-on-glass or system-on-glass. This serves to reduce the thickness and weight of the housings. FIG. 13 shows an embodiment of the present invention in which a display device and a processing circuit are collectively constructed on glass substrates 154 and 156. The two glass substrates 154 and 156 are rotatably connected together using a hinge 158. Resin covers 160 and 162 are provided at ends of the glass substrates 154 and 156 in order to protect the glass substrates 154 and 156. Further, a shaft of the hinge 158 is longer than the width of the glass substrates 154 and 156. When the computer falls down, structural members such as the hinge 158 and the resin covers 160 and 162 serve as cushioning materials to prevent damage caused by a shock. The resin covers 160 and 162 prevent the two glass substrates 154 and 156 from colliding against each other when the hinge is set in a closed state. A protective layer composed of a resin film 164 (not shown) is bonded to a surface of each of the glass substrates 154 and 156 to prevent glass pieces from scattering if the glass is broken. In such an embodiment, the resin covers 160 and 162 and the resin film correspond to housing parts. A connector, a slot, or a radio communication antenna may be stored any of the resin covers 160 and 162 and hinge portion 158; it is difficult to mount the connector, slot, or radio communication antenna on the glass substrate 154 or 156.

In the embodiment, the pressure-sensitive touch panel 18T is utilized as a device that receives an input corresponding to a hand touch. However, a function similar to that provided by the pressure-sensitive touch panel can be provided by an electromagnetic touch panel by installing, around the user's finger, a device having the same function as that of a stylus for the electromagnetic touch panel. It is also possible to emit a light beam of a particular wavelength to the neighborhood of the surface of the LCD panel 18 in the second housing 4 and to use sensors provided at two points to sense the reflected beam to determine where on the panel the user's finger is placed, on the basis of a technique such as triangulation.

Alternatively, the LCD panel may be utilized as a touch panel by incorporating an optical sensor element array into the LCD panel and providing the panel with both display and scanner functions so that the user's finger touching the panel surface can be sensed as an image. A panel having such functions is disclosed in Jpn. Pat. Appln. Publication Nos. 2002-313255, 2002-313273, and 2002-313309 and was put on the market for the first time by Toshiba Matsushita Display Technology Co., Ltd., in April, 2003 under the name of "Input Display". This technique makes it possible to load a barcode or business card information through the panel 14 in the second housing 4 and to recognize the contents of the loaded image information.

The input display can load information from paper or an article tightly contacted with the surface of the display. However, even when nothing contacts the surface of the input display, so that tangible information such as a shape or an image cannot be sensed, the input display can measure environmental light to recognize the brightness of the environment in which the apparatus is placed or the color of a light source, to automatically adjust the brightness and color temperature of a screen shown on the display in the first housing 2 or second housing 4. The input display is effective on various applications; for example, the daytime and the nighttime are recognized to adjust the brightness of the screen in an environment such as a semiconductor plant or a tunnel where a source of light different from white light is used for illumination or when the apparatus is used outdoors.

Figure 14:
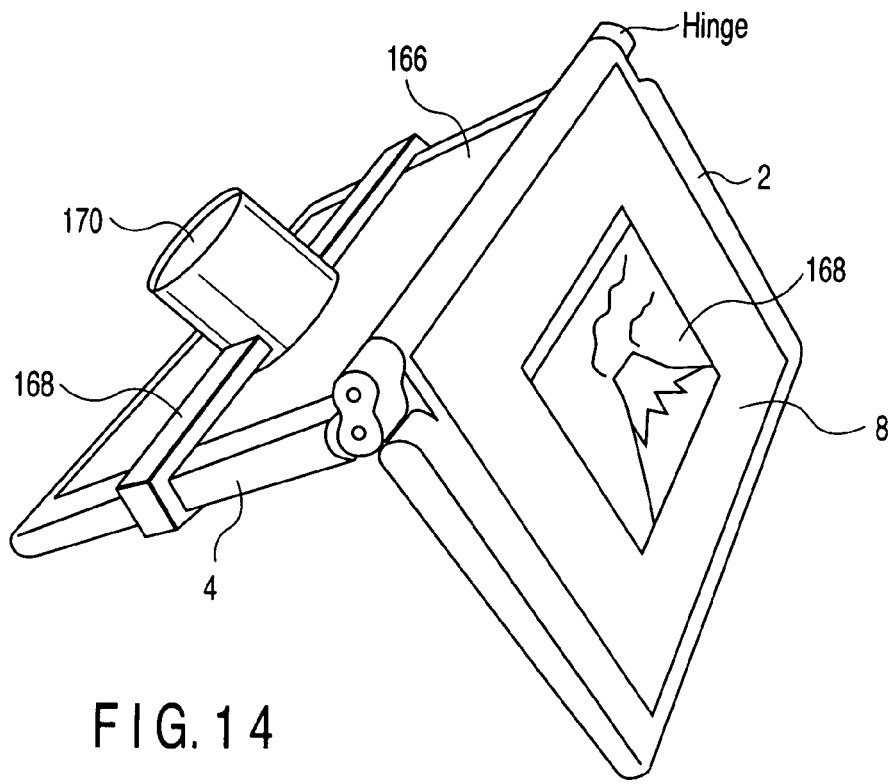
FIG. 14 is a perspective view schematically showing usage of a notebook personal computer comprising an input display function a as an example of a portable electronic apparatus according to further another embodiment of the present invention.

FIG. 14 shows an example of an apparatus comprising an input display 166. In front of the input display 166, built into the second housing 4, a cylindrical lens 170 is fixed to a fixture 168 attached to the second housing 4. The lens 170 forms an image on an image-loadable display surface of the input display 166. This photographed image 168 is displayed on the LCD panel 8. Utilizing the lens 170 as described above enables the input display 1166 to be used like a digital camera. A process for loading an image may also be executed on the areas other than the one to which the lens 170 is attached, to load the brightness and color of the environmental light in order to adjust exposure and white balance.

Figure 15:
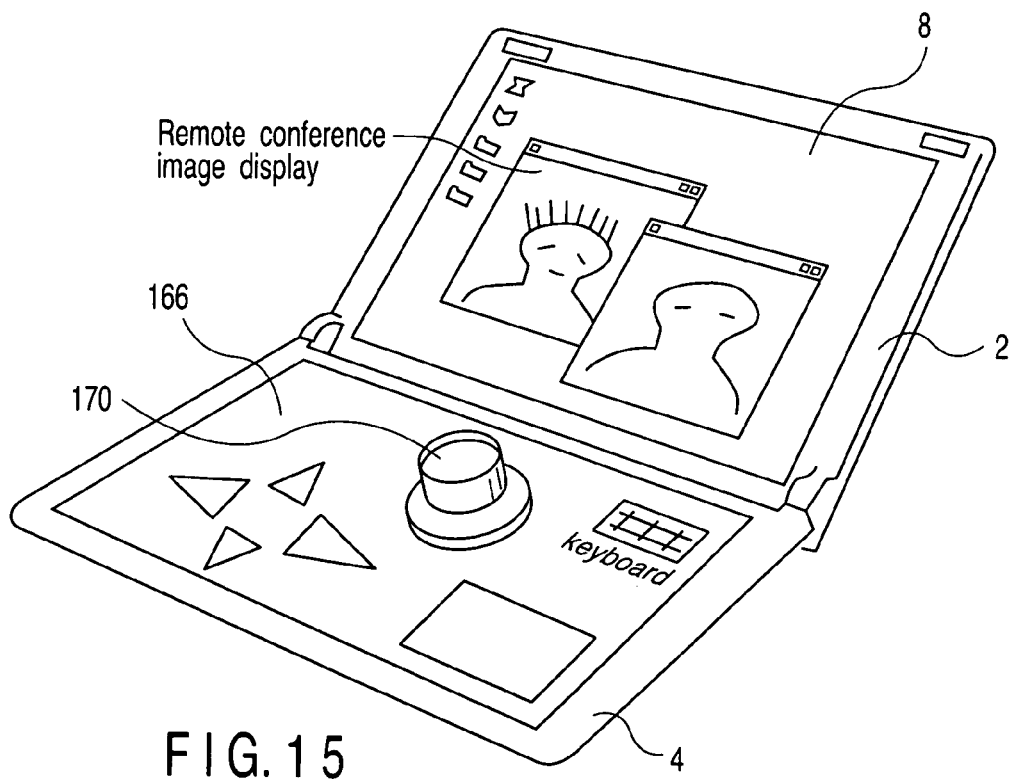
FIG. 15 is a perspective view schematically showing usage of a notebook personal computer comprising an input display function a as an example of a portable electronic apparatus according to yet another embodiment of the present invention.

FIG. 15 also shows an example of an apparatus comprising an input display. As shown in FIG. 15, the cylindrical lens 170 is placed on the input display 166, built into the second housing 4 so as to incline from the input display 166. The lens 170 forms an image on the surface of the image loadable display 166. This personal computer can thus be used as a terminal for a remote conference using communications over a network. The lens 170 is composed of a cylinder inclined to the perpendicular of the surface of the input display 166 so as to face the user, so that an image formed is elongated in the vertical direction. Accordingly, the aspect ratio of the image is corrected by software processing before the image is transmitted over the network.

The personal computer shown in FIG. 15 can not only be used as a terminal for a remove conference but can also, for example, load a spatial gesture such as motion of the user's hand via the lens and use it as an operation instruction to execute the corresponding process.

Figure 16:
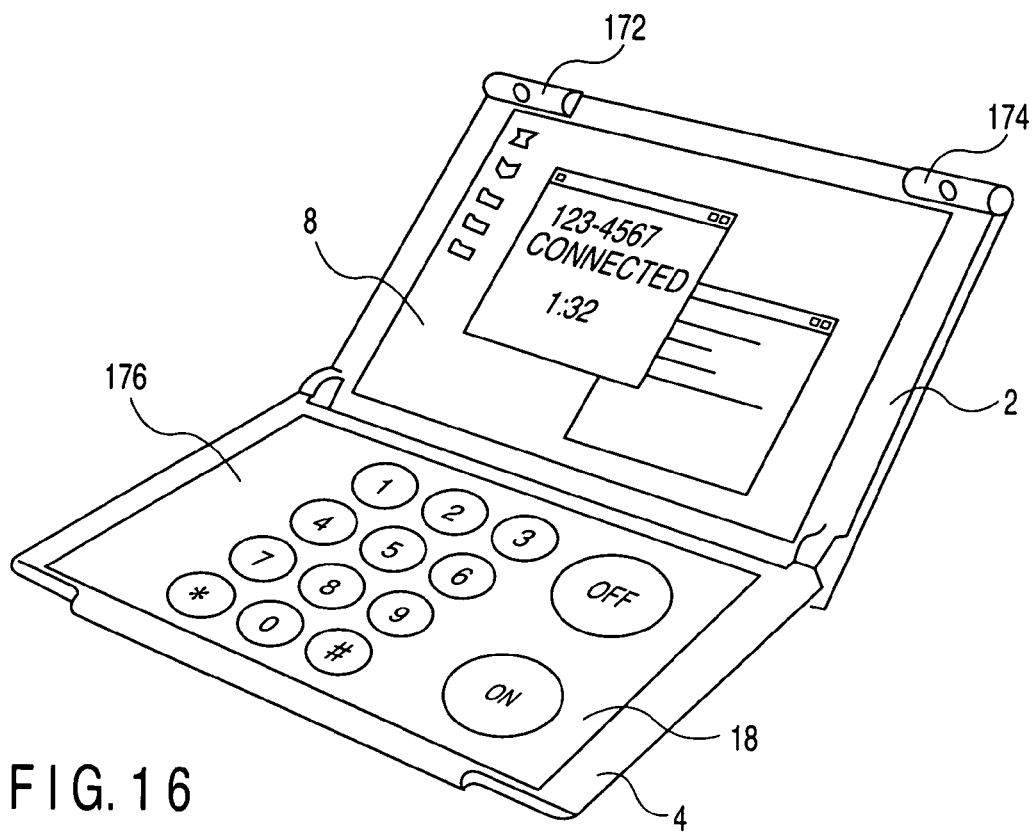
FIG. 16 is a perspective view schematically showing usage of a camera-installed notebook personal computer as an example of a portable electronic apparatus according to still another embodiment of the present invention.

FIG. 16 shows a personal computer in which a camera is installed according to another embodiment of the present invention. The first housing 2 comprises two cameras 172 and 174, and a space on the LCD panel 18 in the second housing 2 is photographed and loaded as an image. Comparison of images from the two cameras makes it possible to measure the distance to the user's hand or the like placed near the LCD panel in the second housing 4. The images from the two cameras make it possible to determine whether or not the user's finger or the like is touching the screen of the LCD panel 18, on which an interface 176 is displayed. The computer compares a temporal variation in the speed of the fingertip in the normal direction of the display surface a preset value. If the temporal variation in speed is larger than the preset value, the computer determines that a key or button has been depressed hard. If the temporal variation in speed is smaller than the preset value, the computer determines that the user's finger or hand is touching the surface of the LCD panel at a low pressure. The present embodiment uses the two cameras, but a single camera may be used provided that the distance can be determined with the single camera on the basis of focal distance or the like. Alternatively, it is possible to use a device which can carry out pointing in a three-dimensional space and which is disclosed in Jpn. Pat. Appln. KOKAI Publication No. 1999-265241 as "Information Input Apparatus and Method for Information Input and Recording Medium".

Figure 17:
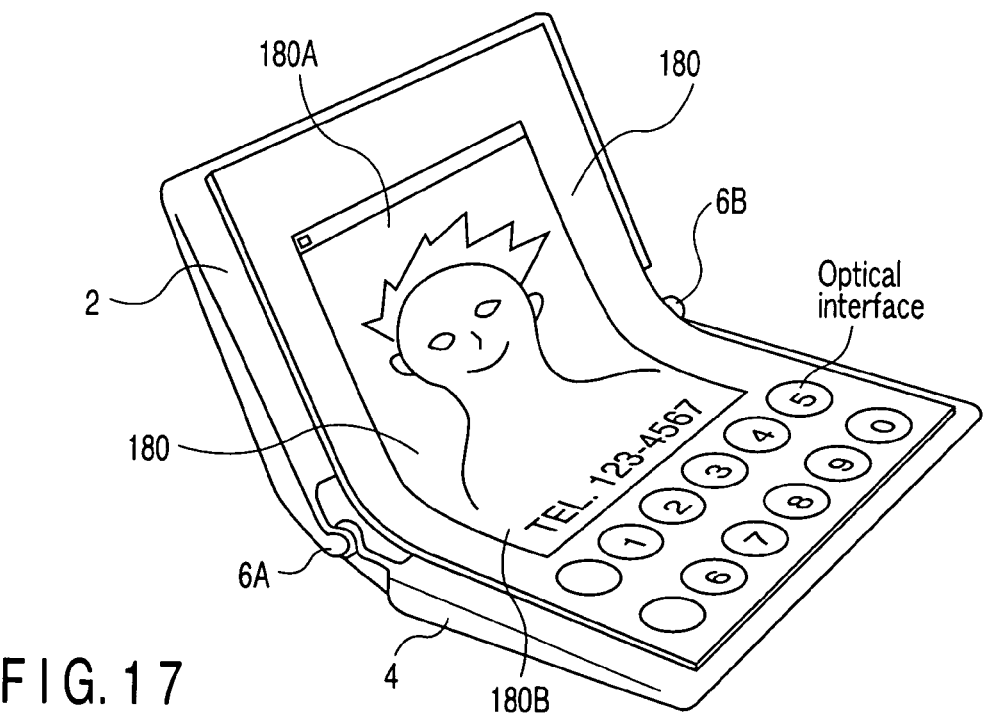
FIG. 17 is a perspective view schematically showing usage of a camera-installed notebook personal computer as an example of a portable electronic apparatus according to further another embodiment of the present invention.

In the description of the above embodiment, the first housing 2 is provided with the first LCD panel 8, and the second housing 4 is provided with the second LCD panel 18. However, given a display device 180 which is flexible and bendable, the bendable display panel 180 may be extended across the first housing 2 and second housing 4 rotatably connected together by the hinges 6A and 6B and may be attached to both housings 2 and 4 as shown in FIG. 17. With the bendable display device 180, a display area 180A in the first housing 2 may be continuously connected to a display area 180B in the second housing 4 so as to prevent the formation of an area between the areas 180A and 180B where no screen is displayed. This further improves the degree of freedom in display and the placement of the operation interface.

The present invention has been described in detail in conjunction with the embodiment of the notebook personal computer. However, the present invention is applicable to a smaller electronic apparatus such as a PDA. The present invention is also applicable to an apparatus such as a foldable cellular phone that enables e-mail or WEB browsing; for such a cellular phone, portability is inconsistent with the size of the screen, and such a cellular phone has different input forms suitable for the respective applications; making a phone call requires only numbers to be input but writing a mail requires characters to be input, and WEB browsing can mostly be achieved simply by operating the cursor.

The inventor has already developed a technique for additionally providing, on the touch panel-installed panel 18, a flexible member with concaves and convexes corresponding to the arrangement of virtual keys, as an assistance to inputs. This invention may be combined with the personal computer according to the present invention. Placing a flexible sheet with concaves and convexes on the touch panel 18 allows various input interfaces to be automatically changed. The sheet with concaves and convexes can be provided far more inexpensively than input peripheral devices even when the user requests an input interface which is substantial, that is, which has concaves and convexes and which is deformed under force.

The invention described above in detail provides an electronic apparatus that is excellent in portability, operability, visibility, and reliability.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An electronic apparatus comprising:
a first display device comprising a first housing and a first display screen which is held in the first housing;
a second display device comprising a second housing and a second display screen which is held in the second housing, the second display screen comprising a sensor which generates a sensor output signal depending on an input on the second display screen;
a connecting mechanism configured to connect the first and second housings together and be able to adjust an opening angle of the first housing and the second housing;
a display processing section configured to display a first display image on the first display screen and a first interface image on the second display screen;
a determining section configured to determine an instruction to the first interface image on the basis of the sensor output signal; and
a control section configured to control the display processing section in response to the instruction to display a second display image in place of the first display image on the first display screen and display a second interface image in place of the first interface image on the second display screen,
wherein the connecting mechanism sets the opening angle of the first housing and the second housing so that the first and second display screens can be viewed from one side of the electronic apparatus, and the second display screen is switched between display of the second interface image on the first interface image and non-display of the second interface image on the first interface image, the display of the second interface image on the first interface image being displayed on top of the first interface image as a translucent or opaque image.

2. The electronic apparatus according to claim 1, wherein the connecting mechanism sets the opening angle of the first housing and the second housing so that the first and second display screens can be viewed from opposite sides of the electronic apparatus, and the first and second display screens display the second display image and the second interface image corresponding to substantially the same image or the second display image and second interface image which are in a mirrored relationship.

3. The electronic apparatus according to claim 1, wherein the first display device further comprises a light source incorporated into the first housing to illuminate the first display screen, and the first housing comprises a structure configured to guide illumination light from the light source to the second display device as backlight illumination or a front-light illumination.

4. The electronic apparatus according to claim 1, wherein the first and second display screens forms one flexible and bendable display unit.

5. An electronic apparatus comprising:
a first display device comprising a first housing and a first display screen which is held in the first housing;
a second display device comprising a second housing and a second display screen which is held in the second housing, the second display screen comprising a sensor which generates a sensor output signal depending on an input on the second display screen;

a connecting mechanism configured to connect the first and second housings together and be able to adjust an opening angle of the first housing and the second housing;

a display processing section configured to display a first display image on the first display screen and a first interface image on the second display screen;

a determining section configured to determine an instruction to the first interface image on the basis of the sensor output signal; and a control section configured to control the display processing section in response to the instruction to display a second display image in place of the first display image on the first display screen and display a second interface image in place of the first interface image on the second display screen, wherein the first display device further comprises a light source incorporated into the first housing to illuminate the first display screen, and the first housing comprises a structure configured to guide illumination light from the light source to the second display device as backlight illumination or a front-light illumination.

* * * * *